US008500032B2

(12) United States Patent
Shute et al.

(10) Patent No.: US 8,500,032 B2
(45) Date of Patent: Aug. 6, 2013

(54) MULTI-TOOL PROTECTION DEVICE

(75) Inventors: Matthew R. Shute, Huntersville, NC (US); William J. Kozlowski, Waxhaw, NC (US)

(73) Assignee: Checkpoint Systems, Inc.

( * ) Notice: Subject to any disclaimer, the term of this patent is extended or adjusted under 35 U.S.C. 154(b) by 7 days.

(21) Appl. No.: 13/248,369

(22) Filed: Sep. 29, 2011

(65) Prior Publication Data

US 2012/0085827 A1 Apr. 12, 2012

Related U.S. Application Data

(60) Provisional application No. 61/391,282, filed on Oct. 8, 2010.

(51) Int. Cl.
*G06K 19/06* (2006.01)

(52) U.S. Cl.
USPC ............ 235/492; 235/487; 235/375; 235/451

(58) Field of Classification Search
USPC ................. 235/492, 375, 451, 381, 385, 439, 235/446, 487
See application file for complete search history.

(56) References Cited

U.S. PATENT DOCUMENTS

| | | | |
|---|---|---|---|
| 4,993,245 | A | 2/1991 | Ott |
| 6,518,888 | B1 | 2/2003 | Kolton et al. |
| 6,837,373 | B2 | 1/2005 | Huang |
| 7,249,401 | B2 | 7/2007 | Copen et al. |
| 2007/0067971 | A1 | 3/2007 | Nguyen et al. |

*Primary Examiner* — Edwyn Labaze

(57) ABSTRACT

An apparatus and method for protecting merchandise items is presented. In the preferred embodiment, a merchandise protection device includes first and second portions. An EAS tag is contained in the first or second portion. The first and second portions are connected together to form a head at a first end of the merchandise protection device and a base at the other end of the merchandise protection device. An opening is formed between the head and the base. The head is placed in a first recess of a merchandise item to be protected and the base is placed in a second recess of the merchandise item to be protected. The opening is configured to receive a portion of the merchandise item between the first recess and second recess.

19 Claims, 10 Drawing Sheets

MULTI-TOOL PROTECTION DEVICE

CROSS REFERENCE TO RELATED APPLICATION

This application claims priority from U.S. Provisional Application Ser. No. 61/391,282 filed Oct. 8, 2010; the disclosure of which is incorporated herein by reference.

BACKGROUND OF THE INVENTION

1. Field of Invention

The present invention relates to anti-theft devices for items of merchandise. More particularly, this invention relates to securing a device having an EAS tag onto an irregularly-shaped article to prevent theft. Specifically, this invention relates to attaching a theft prevention device around an irregularly-shaped object such as a pair of pliers or another tool or item of merchandise.

2. Background Information

Heretofore, there have existed many product independent anti-theft devices intended to secure a wide range of commercial products. For example, electronic article surveillance (EAS) tags may be placed inside a box, adhered onto a product, or placed within the pages of a book. To defeat the EAS tag, an individual would only have to remove it from the product. As a natural consequence, anti-theft devices have evolved to include devices which secure the EAS tag to the product while also protecting the tag from tampering and removal. These devices must incorporate attachment mechanisms which are simultaneously difficult for a thief to remove, yet easy for a checkout clerk to remove when supplied with the right key. At present, many anti-theft devices are generally "one size fits all" and product independent. Furthermore, present anti-theft devices require a key or code to unlock the anti-theft device, adding complexity and time to the checkout process.

In recent years, hardware and home improvement stores have seen an increase in thefts of articles such as pliers and other tools which are relatively small in size and easy to steal. Because they are relatively small and have a high value, these items are a popular item for thieves. Higher end tools cost several hundred dollars and are located on the sales floor so that customers may easily view and consider the tool's shape, color and style. Tools are often displayed without significant packaging or in paper and/or plastic packaging that is easily opened and ripped apart. Therefore, placing an EAS tag inside the box or on the box itself is useless as a thief would simply open or rip the box open and remove the EAS tag. However, home improvement stores commonly carry hundreds of different tools which are sold in high volumes, and applying a more elaborate anti-theft device such as a cable wrap device or using a security box would add substantial complexity to the storage and checkout of tools and other irregularly-shaped items. Therefore, stores have not secured these products as the cost and complexity to do so have generally outweighed the losses due to theft. However, as thefts of tools have increased, stores have turned to the commercial suppliers of anti-theft devices and a better way of protecting irregularly-shaped objects (such as tools) is desired.

SUMMARY OF THE INVENTION

The preferred embodiment of the invention includes a merchandise protection device with first and second portions. An EAS tag is contained in the first or second portion. The first and second portions are connected together to form a head at a first end of the merchandise protection device and a base portion at the other end of the merchandise protection device. An opening is formed between the head and the base. The head is placed in a first recess of a merchandise item to be protected and the base is placed in a second recess of the merchandise item to be protected. The opening is configured to receive a portion of the merchandise item between the first recess and the second recess.

In another configuration of the preferred embodiment, a neck portion is formed between the head and the base that is configured to pass through a pivot axis of the merchandise item.

In some configurations of the preferred embodiment, the first and second portions may contain one more or more grooves, lips, upper ridges and/or lower edges so that the first and second portions can be easily fitted together to form a secure connection.

In another embodiment, instead of a head being located at one end of the merchandise protection device, a loop is formed at that end of the protection device when the first and second portions are attached together. The loop is configured to hold (e.g., wrap around) one end of a merchandise item being protected by the protection device.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
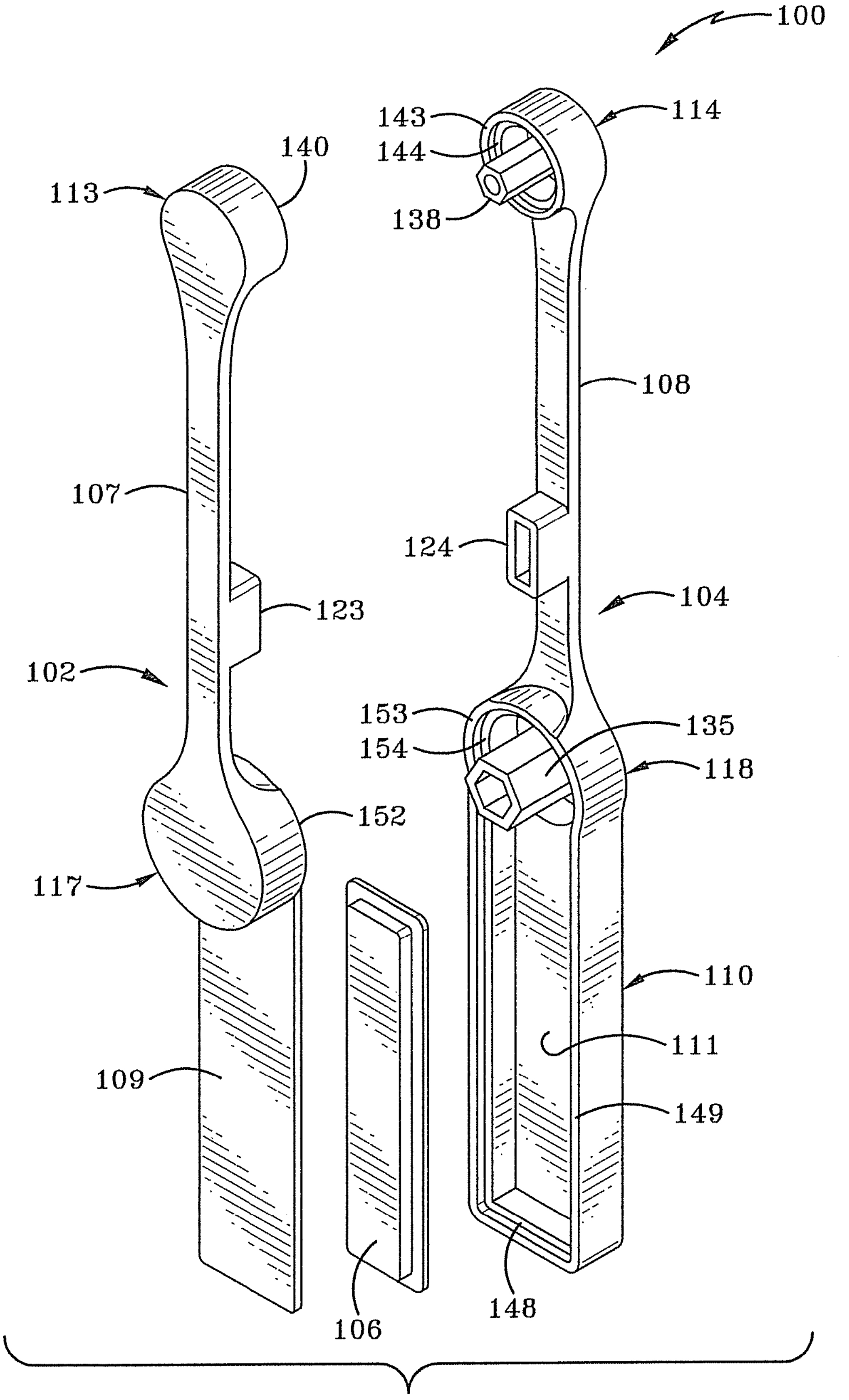
FIG. 1 illustrates an exploded view looking toward the left side of a preferred embodiment of a merchandise protection device.
Figure 2:
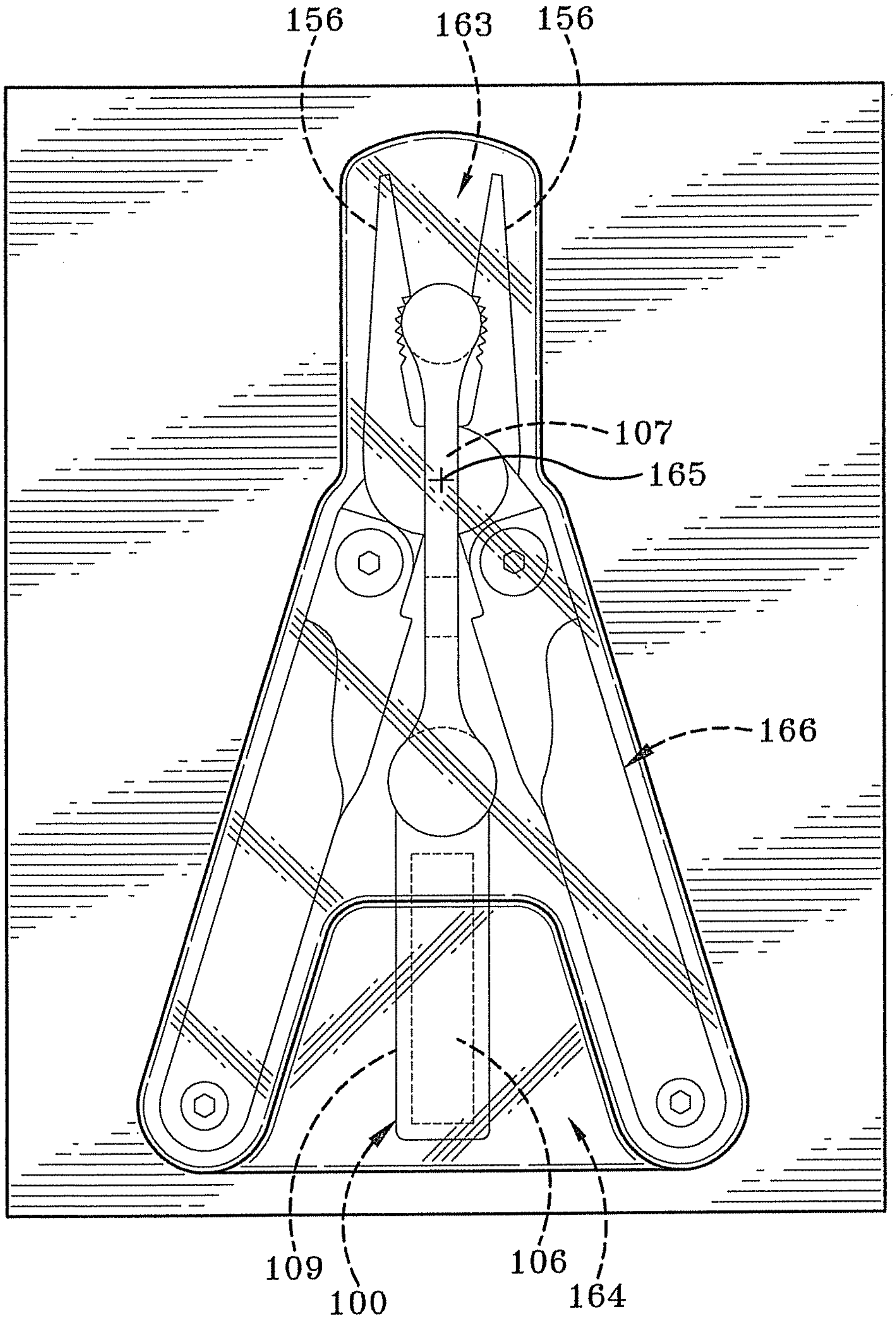
FIG. 2 illustrates a top view of the preferred embodiment of the merchandise protection device protecting a pair of pliers as packaged.
Figure 3:
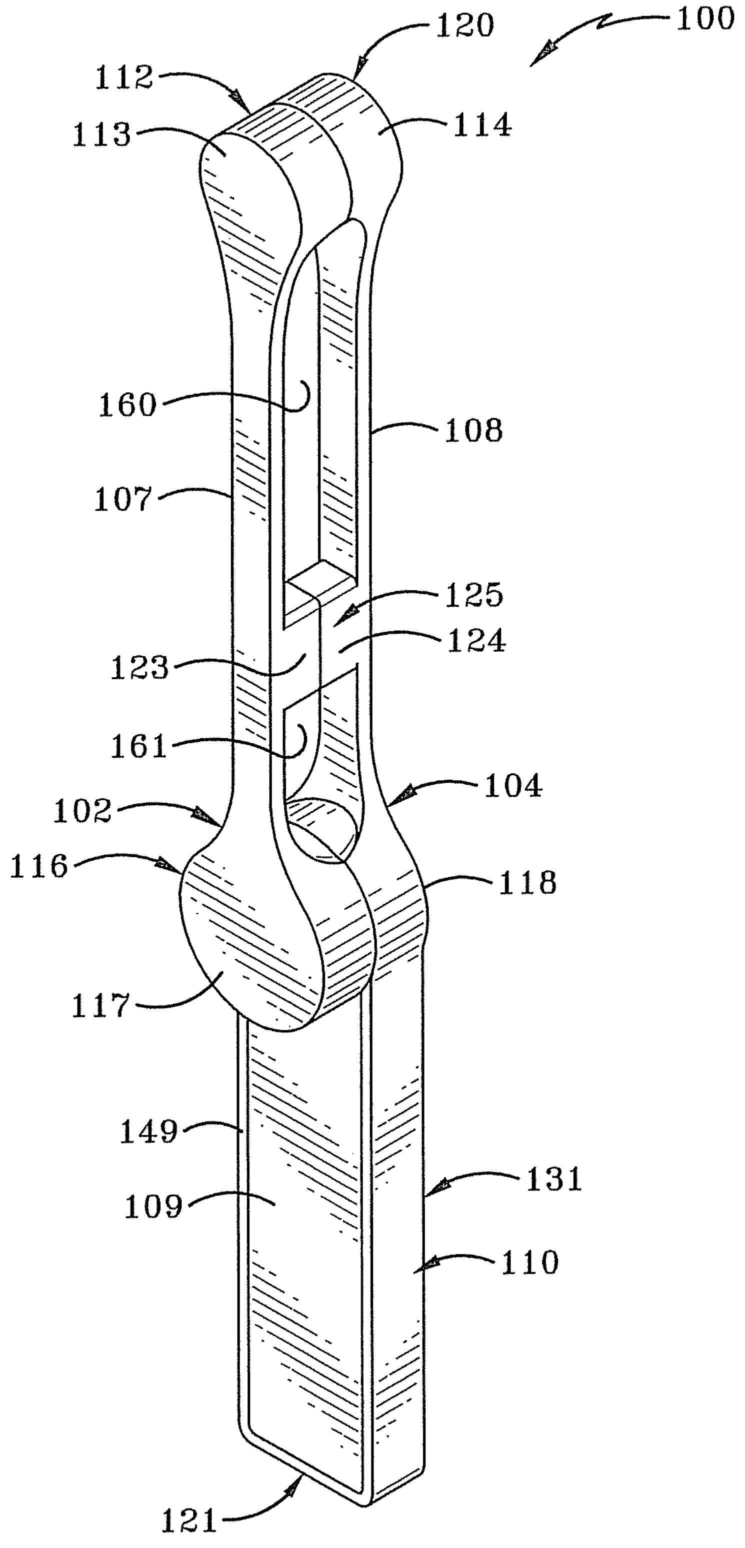
FIG. 3 illustrates an isometric view looking toward the left side of the preferred embodiment of the assembled merchandise protection device.
Figure 4:
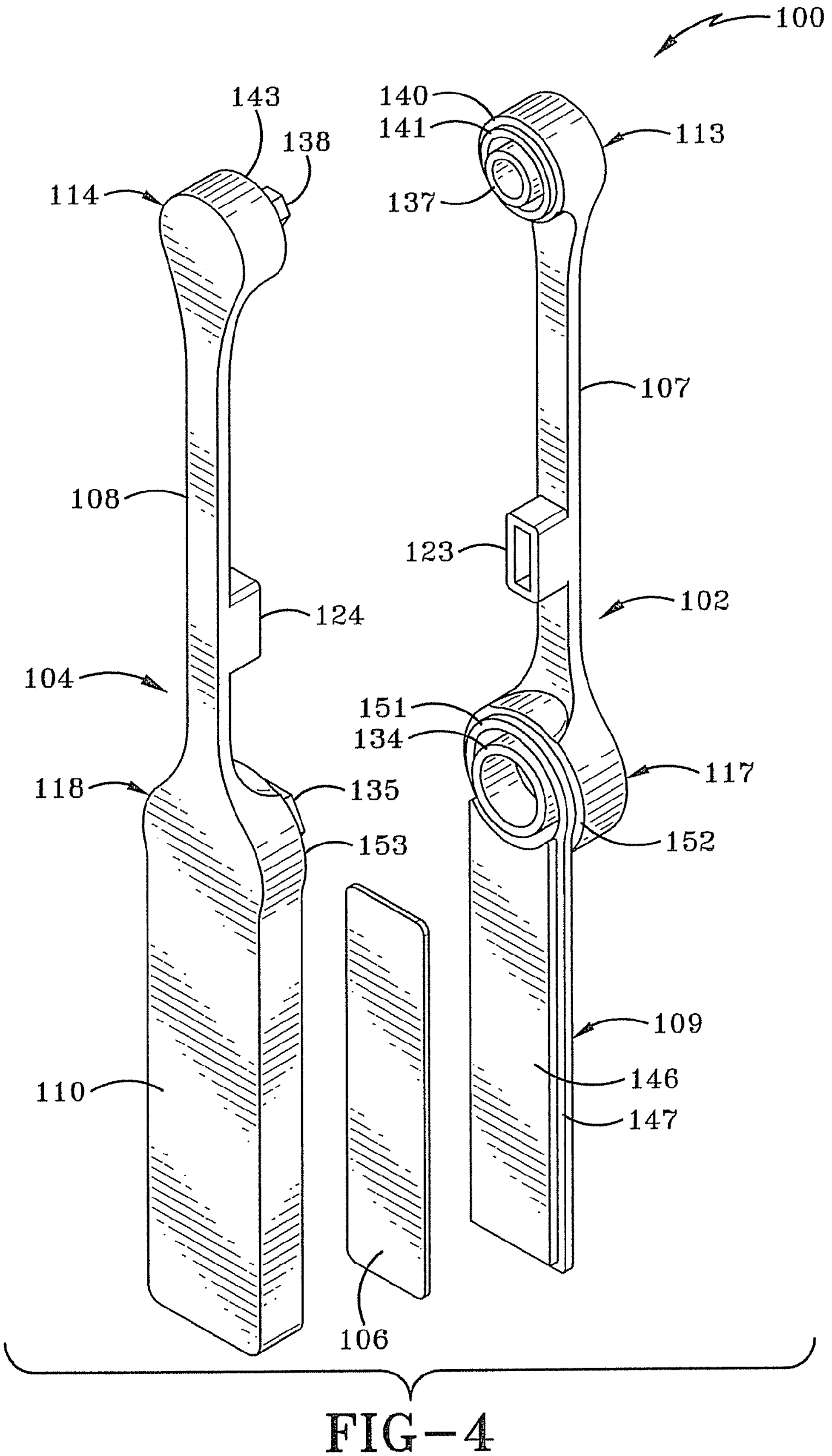
FIG. 4 illustrates an exploded view looking toward the right side of the preferred embodiment of the merchandise protection device.
Figure 5:
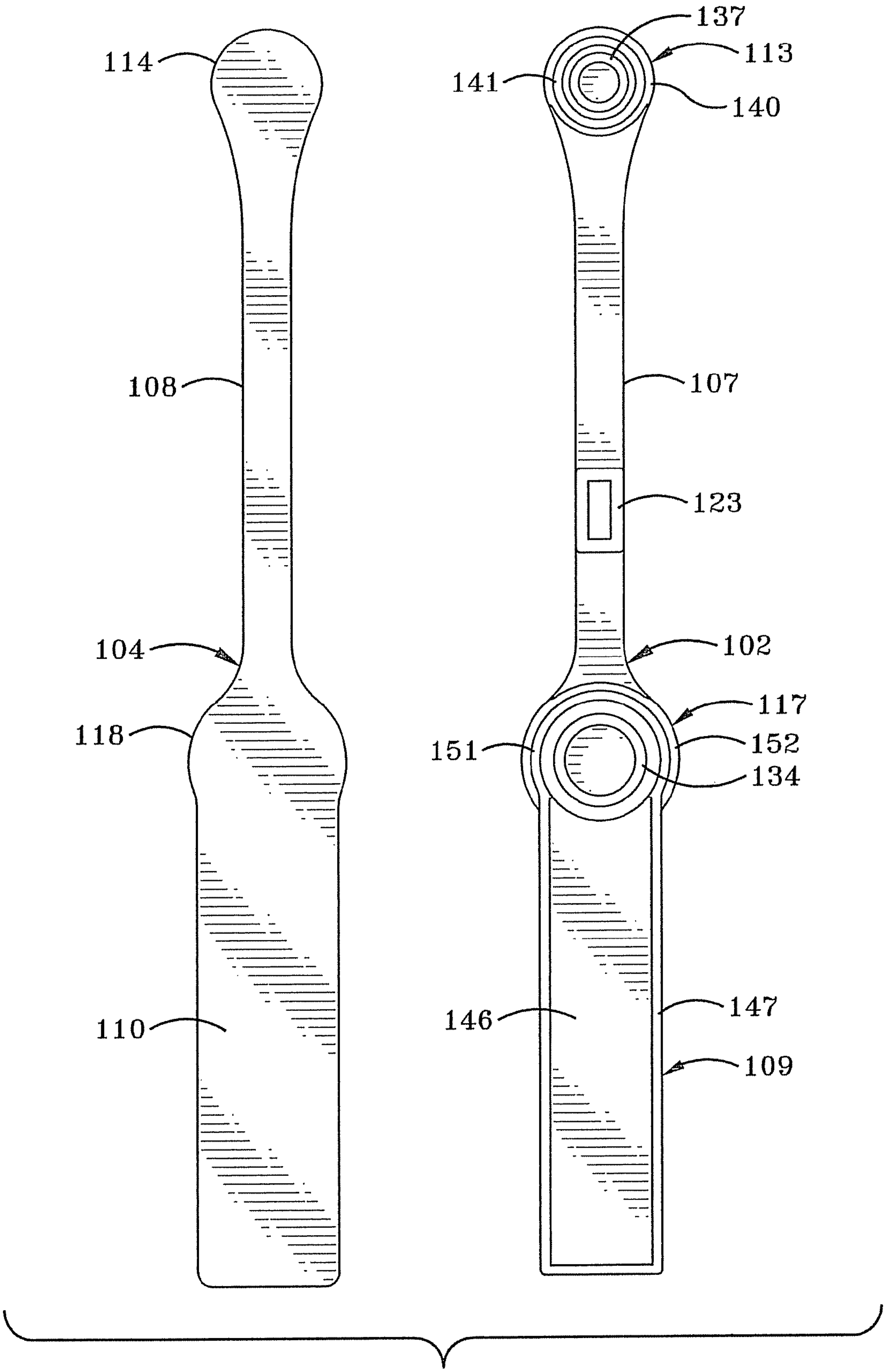
FIG. 5 illustrates bottom views of the left portion and the right portion of the preferred embodiment of the merchandise protection device.
Figure 6:
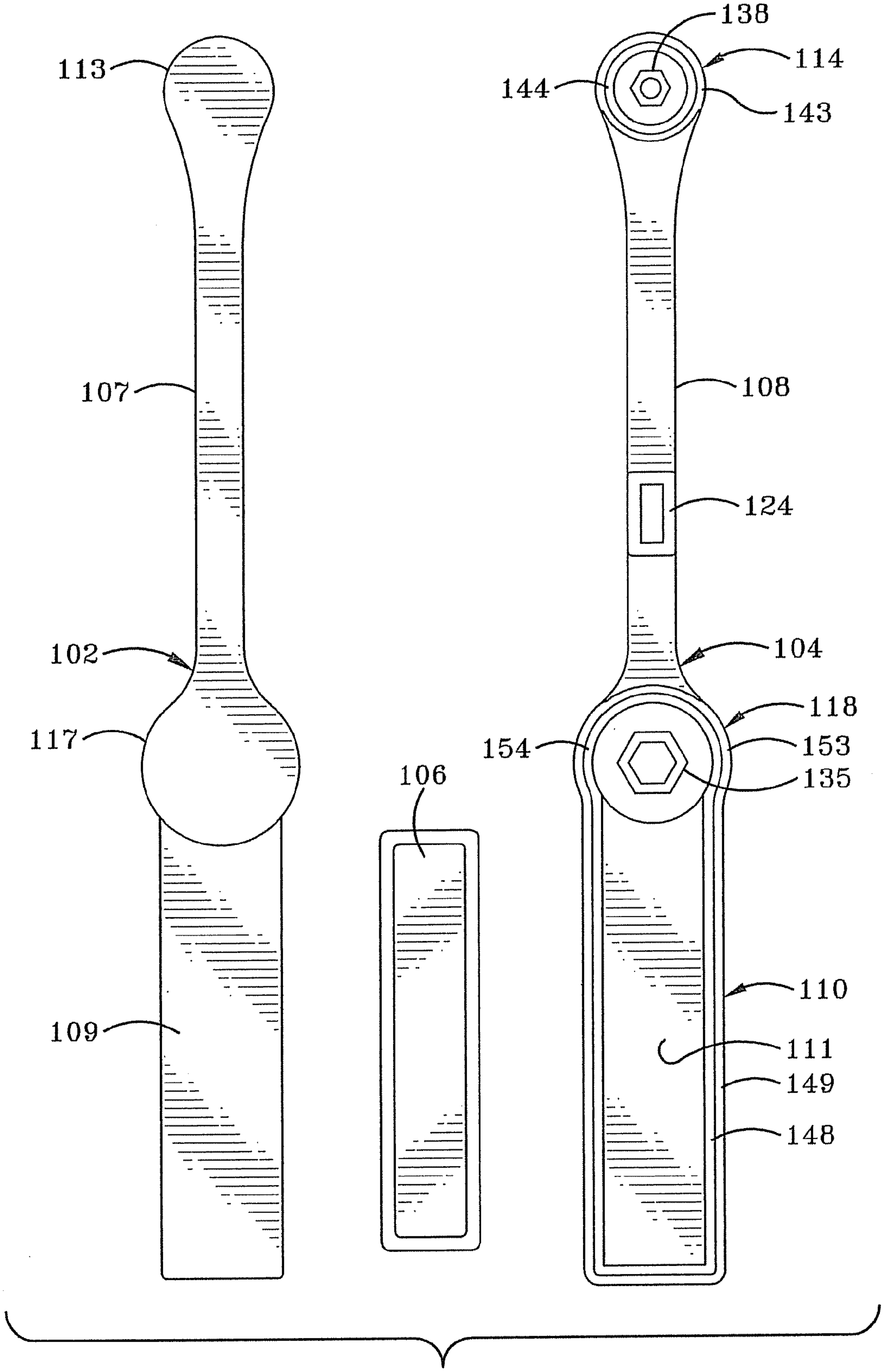
FIG. 6 illustrates top views of the left portion and the right portion of the preferred embodiment of the merchandise protection device.
Figure 7:
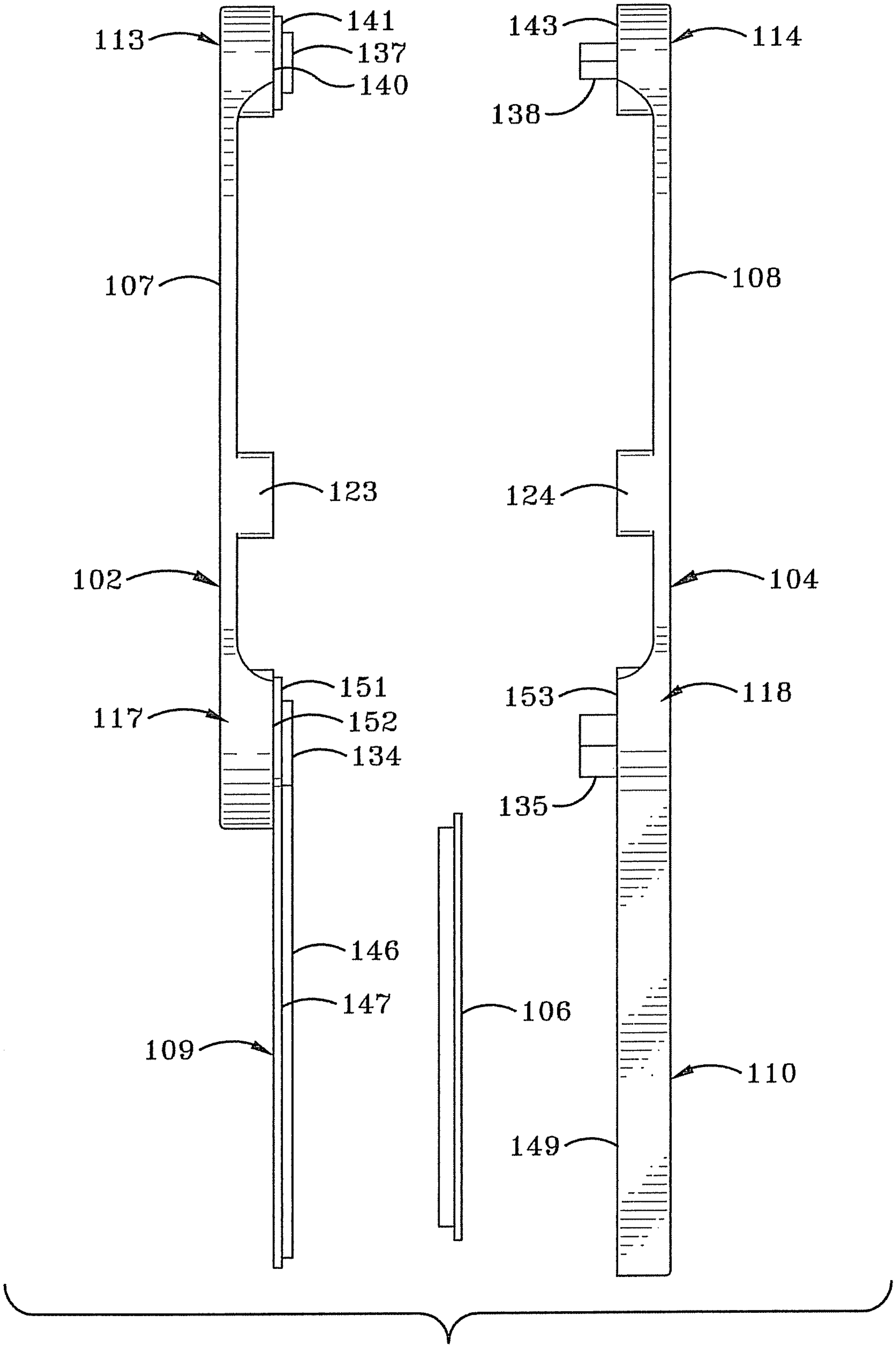
FIG. 7 illustrates unassembled side views of the left portion and the right portion of the preferred embodiment of the merchandise protection device.
Figure 8:
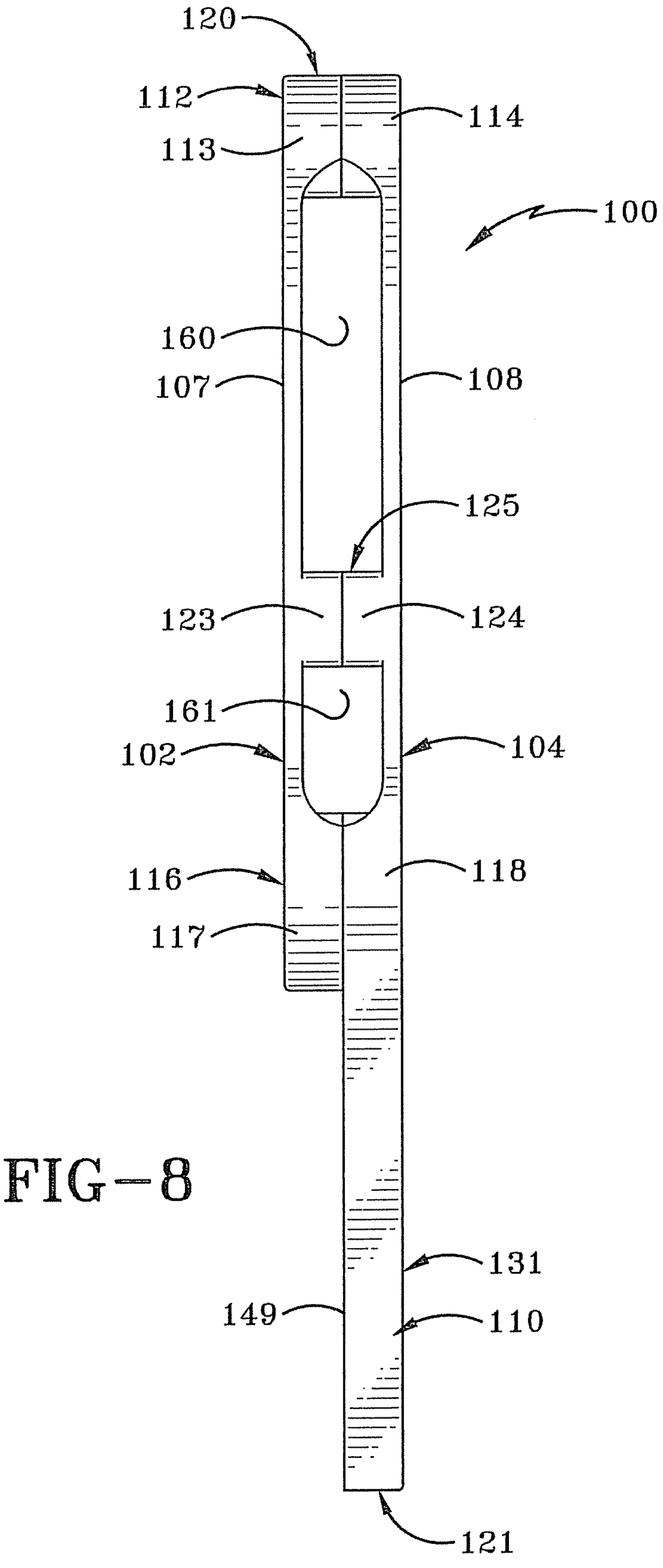
FIG. 8 illustrates assembled side views of the left portion and the right portion of the preferred embodiment of the merchandise protection device.

FIG. 1 illustrates the preferred embodiment of a merchandise protection device 100. The merchandise protection device 100 includes a left portion 102 and a right portion 104. The left and right portions 102 and 104 are configured to be attached together around an EAS tag 106. In the preferred embodiment, the left and right portions 102, 104 are elongated members that can be fastened together around a merchandise item such as a pair of pliers 166 (FIG. 2) or another tool or merchandise item. The left and right portions 102, 104 form an elongated merchandise protection device 100 with a top end 120 and a bottom end 121.

Left portion 102 can be formed with a left neck portion 107 and a left base portion 109. Similarly, right portion 104 can be formed with a right neck portion 108 and a right base portion 110. When left portion 102 and right portion 104 are fastened together, the left and right neck portions 107, 108 form a neck 130 and the left and right base portions 109 and 110 form a base 131 of protection device 100. Base 131 may include walls that form a rectangular-shaped chamber 111. EAS tag 106 is located in the chamber 111 formed by the left base portion 109 and right base portion 110.

Head 112 is formed at top end 120 of the merchandise protection device 100 by left and right head portions 113, 114 of the respective left and right portions 102, 104. As discussed in greater detail below, head portion 112 is formed of material so that the head portion is difficult to crush or is un-crushable by pliers 166 or other merchandise item that the merchandise protection device 100 is protecting. Of course, those of ordinary skill in the art will appreciate that the protection device 100 could be used to protect pliers 166, linesman pliers, wrenches and the like, or any hand tool with a pivot axis 165 (shown in FIG. 2).

In the preferred embodiment, when the left and right portions 102, 104 are connected together, a central body portion 116 is formed by left and right central body portions 117, 118 of the left and right portions 102, 104 of the merchandise protection device 100. The central body portion 116 may be circular and/or cylindrical-shaped.

In the preferred embodiment, left and right projections 123, 124 can respectively be formed on the left and right portions 102, 104. When the left and right portions 102, 104 are connected together, the left and right projections 123, 124 form a cross member 125. As discussed below, cross member 125 is positioned to ensure that the pliers 166 or other merchandise item protection device 100 is protecting cannot be removed from the merchandise protection device 100 by a thief.

In the preferred embodiment, a left head projection 137 extends outwardly from the left head portion 113 and a right head projection 138 extends outwardly from the right head portion 114. The right head projection 138 slidably fits within the left head projection 137 to help align with left and right portions 102, 104 as they are brought together. In the preferred embodiment, the left head projection 137 is annular or circular in shape while the right head projection 138 is an elongated hexagonal shape. Those of ordinary skill in the art will appreciate that the left and right head projections 137, 138 can be shapes other than those described here.

Left head portion 113 further includes a left head recessed edge 140 and a left head lip 141. Right head portion 114 includes a right head elevated edge 143 that is complementary to the left head recessed edge 140 as well as a right head lower edge 144 that is complementary to the left head lip 141.

The left base portion 109 includes a left base elevated portion 146 and a left base recessed shoulder 147. The right base portion 110 includes a right base recessed edge 148 that is complementary to the left base elevated portion 146 as well as a right base elevated edge 149 that is complementary to the left base recessed shoulder 147. The elevated portion 146 fits within the chamber 111 formed by the right base portion 110 and the left base recessed shoulder 147 abuts the right base recessed edge 148 when the merchandise protection device is assemble and attached to a merchandise item 166.

The left central body portion 117 includes a left central body elevated edge 151 and a left central body recessed edge 152. The right central body portion 118 includes a right central body elevated edge 153 that is complementary to the left central body recessed edge 152 as well as a right central body recessed edge 154 that is complementary to the left central body elevated edge 151.

In the preferred embodiment, a left central projection 134 extends outwardly from the left central portion 117 and a right central projection 135 extends outwardly from the right central portion 117. Right central projection 135 slidably fits within left central projection 134 to help align left and right portions 102 and 104 as they are brought together. In the preferred embodiment, the left central projection 134 is annular or circular in shape while the right central projection 135 is an elongated hexagonal shape. Those of ordinary skill in the art will appreciate that the left and right head projections 134, 135 can be shapes other than those described here.

The lips, edges and ridges of the head portion 112, central body portion 116 and base 131 allow left portion 102 and right portion 104 to be guided and fitted together. In one configuration of the preferred embodiment, left and right portions 102 and 104 are configured to be sonic welded at one or more of the lips, edges and ridges of the head portion 112, central body portion 116 and base 131. In another configuration, the left and right portions 102, 104 are configured to be fastened together with screws. In other configurations of the preferred embodiment, the left and right portions 102, 104 can be fastened together by gluing, snap-fitting and/or other methods as understood by those of ordinary skill in the art.

When the left and right portions 102, 104 are fastened together, one or more openings are formed in neck 130 of the protection device 100. For example, in the preferred embodiment, a first opening 160 and second opening 161 are formed in neck 130 on opposite sides of the cross member 125. First opening 160 is of sufficient size so that the protection device 100 can be placed on a pair of pliers 166 or other merchandise item so that head portion 112 is between the jaws of the pliers 166 and base 131 is between the open handles of the pliers 166. The first opening 160 is also of a sufficient size so that the protection device 100 cannot be manipulated so that the jaws of the pliers 166 can be slipped out of the first opening 160. The second opening 161 may be sized so that base 131 extends sufficiently downward from the metal handles of the pliers 166 so that they do not interfere with the EAS tag 106 in the base 131.

The open area of the jaws 156 of pliers 166 forms a first recess area 163, and the open area between the handles of the pliers 166 forms a second recess area 164. Protection device 100 is positioned so that the head portion 112 is in the first recess area 163 and the base 131 is in the second recess area 164. In this position, neck 131 passes over an axis point 165 that the pliers 166 operate about. Of course, those of ordinary skill in the art will appreciate that the pliers 166 could be other items such as lineman pliers, wrenches and the like.

Figure 9:
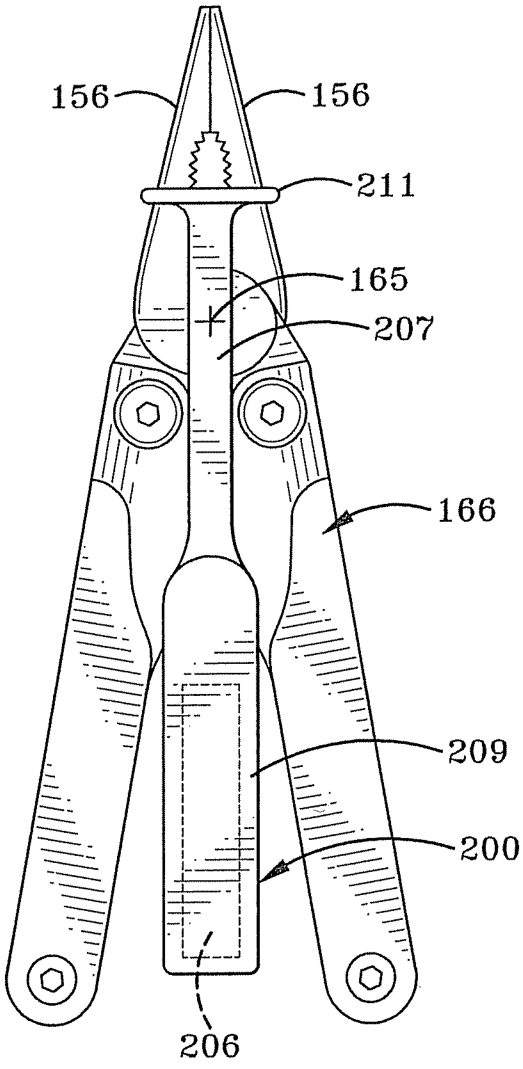
FIG. 9 illustrates a second embodiment of the merchandise protection device.

FIG. 9 illustrates a second embodiment of a merchandise protection device 200 that is formed by connecting two complementary portions together similar to the protection device 100 of FIGS. 1-8. When the two portions of FIG. 9 are connected together, they form an annular (e.g. circular) portion 211 that fits around the jaws 156 of a pair of pliers 166. This protection device 200 has a neck 207 and a base 209 containing an EAS tag 206 similar to the merchandise protection device 100 of FIGS. 1-8. Similar to the first embodiment of merchandise protection device 100, neck 207 of merchandise protection device 200 passes over the axis 165 that the jaws 156 of the pliers 166 pivot about.

Figure 10:
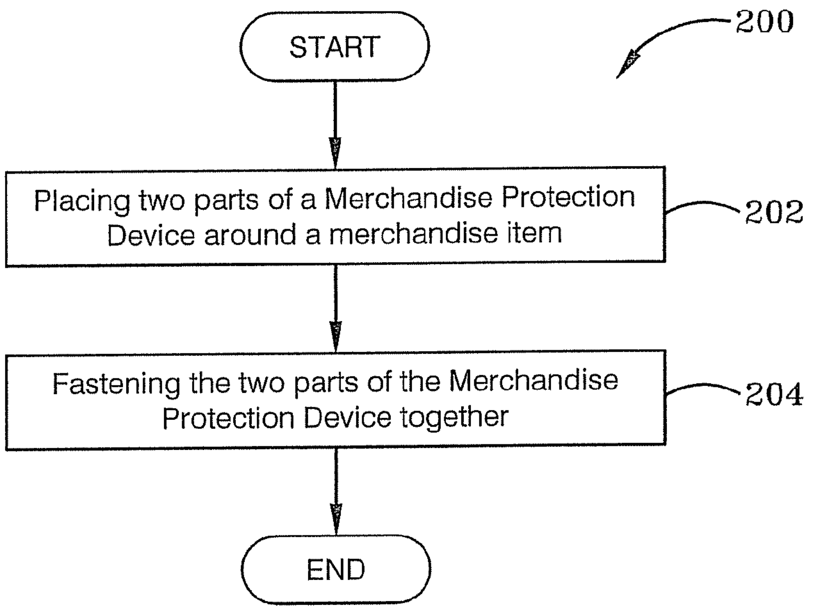
FIG. 10 illustrates an embodiment of a method for using the preferred embodiment of the merchandise protection device.

Having described the structure of the preferred embodiment of the merchandise protection device of the present invention, the use of the device is now described with reference to a method 200 of using the protection device as illustrated in FIG. 10. The example methods may be better appreciated with reference to a flow diagram. While for purposes of simplicity of explanation, the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Method 200 begins by placing two parts of a merchandise protection device around a merchandise item, at 202. For example, a merchandise protection device such as the one described above with reference to FIGS. 1-8 can be used to protect pliers, another tool or other item. The left portion of the protection device can be placed on one side of the pliers and the right portion of the protection device can be placed on the other side the pliers. A head of the protection device is formed at one end of the protection device when the left and right portions are placed together so that the head is in the jaws of the pliers. The head of the protection device is placed in the jaws of the pliers so that it is difficult, if not impossible, to crush the head using the pliers. A base is formed at the other end of the protection device when the left and right portions are combined so that the base is between the two handles of the pliers when the pliers are in an open position. This is to ensure an EAS tag in the base of the pliers is not interfered with by the handles of the pliers.

Next, the two parts of the merchandise protection device are fastened together, at 204. As previously mentioned, the two parts can be sonic welded together, screwed together, glued together or fastened together by another means. In the preferred embodiment, the merchandise protection device can be easily removed from the merchandise item after the merchandise item has been removed from its packaging. For example, screws holding the merchandise protection device together can be removed once the item is unwrapped, scissors can be used to cut the device off of the merchandise item or the device may be removed in another way.

The merchandise protection device is generally a disposable device that is installed to a merchandise item to be protected when the merchandise item is produced and packaged before it is shipped to a retailer. The retailer can then sell the merchandise item with the merchandise protection device attached to the item along with any necessary packaging. All that a merchant needs to do is scan the device to deactivate the EAS tag when the merchandise item with the protection device attached to it has been purchased and paid for. Later, after the item has been purchased, the purchaser of the item can take the merchandise item home and remove it from its packaging and remove the protection device.

The merchandise protection device can be attached to a merchandise item with a first recess and a second recess. For example, the opening formed by the open jaws of the pliers forms a first recess where the head of the protection device resides and the base of the protection device wherein the EAS tag resides in a second recess formed by the open handles of the pliers. The merchandise protection device is also configured so that the neck of the device crosses (e.g. straddles) an axis the jaws of the pliers pivot about.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A merchandise protection device comprising:

a first portion;

a second portion;

an electronic article surveillance (EAS) tag contained in one of the first portion and the second portion;

wherein the first portion and second portion are configured to be connected together to form a head at a first end of the merchandise protection device and a base portion at a second end of the merchandise protection device, wherein an opening is formed between the head and the base; and wherein the head is adapted to be placed in a first recess of a merchandise item to be protected and the base is adapted to be placed in a second recess of the merchandise item to be protected, and wherein the opening is adapted to receive a portion of the merchandise item between the first recess and second recess;

wherein the head further comprises:

a first head portion on the first portion with a first head projection extending outward from the first head portion and;

a second head portion on the second portion with a second head projection extending outward from the second head portion, wherein the second head projection slidably fits within the first head projection.

2. The merchandise protection device of claim 1 further comprising:

a main neck portion formed between the head and the base that is configured to pass adjacent a pivot axis of the merchandise item.

3. The merchandise protection device of claim 2 further comprising:

a first neck portion formed on the first portion;

a second neck portion formed on the second portion, wherein the first neck portion and the second neck portion form the main neck portion.

4. The merchandise protection device of claim 3 further comprising:

a first protrusion extending from the first neck portion;

a second protrusion extending from the second neck portion, wherein the first protrusion and the second protrusion combine to form a shaft extending from a first neck portion to the second neck portion.

5. The merchandise protection device of claim 4, wherein the shaft is positioned between the pivot axis and the base.

6. The merchandise protection device of claim 2 wherein the head is adapted to be placed between a pair of levers of the merchandise item that pivot at the pivot axis.

7. The merchandise protection device of claim 1 wherein the head is generally cylindrical in shape.

8. The merchandise protection device of claim 1 wherein the merchandise protection device is elongated with the head at the first end of the merchandise protection device and the base at the second end of the merchandise protection device.

9. The merchandise protection device of claim 1 wherein the EAS tag is located in the base.

10. The merchandise protection device of claim 1 wherein the first portion is an elongated first half; and the second portion is an elongated second half configured to attach to the elongated first half.

11. The merchandise protection device of claim 10 wherein the first elongated half is configured to attach to the second elongated half so that the merchandise item passes through the opening.

12. The merchandise protection device of claim 11 wherein the anti-theft device is adapted to be attached to the merchandise time so that the elongated first half passes over the pivot axis and the elongated second half passes over the pivot axis.

13. The merchandise protection device of claim 10 wherein one end of the anti-theft device further comprises:

a loop at the first end of the anti-theft device when the first elongated half is attached to the second elongated half, wherein the loop is adapted to wrap around one end of the merchandise item when the anti-theft device is attached to the merchandise item.

14. A combination comprising:

a merchandise item that includes a first portion and a second portion attached together at a pivot point, wherein the first portion and the second portion pivot with respect to each other at the pivot point;

a merchandise protection device comprising:

an EAS tag; and a pair of elongated side plates with two ends adapted to be attached together at the two ends to form a through hole between the two ends, wherein the elongated side plates are adapted to be attached together about the merchandise item with a portion of the merchandise item passing through the through hole;

wherein the elongated merchandise item further comprises:

two separate jaws, wherein one jaw is formed on the first portion and the other jaw is formed on the second portion, where the two separate jaws are adapted to rotate about the pivot point and wherein the merchandise protection device further comprises:

a head located at one of the ends of the elongated side plates when the merchandise protection device is attached about the merchandise item, wherein the head is located within the two jaws when the merchandise protection device is attached about the merchandise item and when the two jaws are in an open position.

15. The combination of claim 14 wherein the head further comprises: a first head portion on the first portion with a first head projection extending outward from the first head portion and; a second head portion on the second portion with a second head projection extending outward from the second head portion, wherein the second head projection slidably fits within the first head projection.

16. The combination of claim 14 wherein the head is generally cylindrical in shape and is formed out of a matter with sufficient strength to prevent being crushed when attached to the merchandise item.

17. The combination of claim 14 wherein the pair of elongated side plates comprise a first elongated slide plate with a recessed portion and a second elongated slide plate with a protruding portion adapted to slidably fit within the recessed portion of the first elongated side plate.

18. The combination of claim 14 wherein the elongated side plates pass adjacent the pivot point when the merchandise protection device is attached about the merchandise item.

19. A combination comprising:

a merchandise item that includes a first portion and a second portion attached together at a pivot point, wherein the first portion and the second portion pivot with respect to each other at the pivot point;

a merchandise protection device comprising:

an EAS tag; and a pair of elongated side plates with two ends adapted to be attached together at the two ends to form a through hole between the two ends wherein the elongated side plates are adapted to attached together about the merchandise item with a portion of the merchandise item passing through the through hole;

wherein the elongated merchandise item further comprises:

two separate jaws, wherein one jaw is formed on the first portion and the other jaw is formed on the second portion, where the two separate jaws are adapted to rotate about the pivot point and wherein the merchandise protection device further comprises:

a loop end forming a loop with a central opening located at one of the ends of the elongated side plates when the merchandise protection device is attached about the merchandise item, wherein the loop end wraps around the two jaws when the merchandise protection device is attached about the merchandise item and when the two jaws are in a closed position.

* * * * *